(12) United States Patent
Takizawa et al.

(10) Patent No.: US 11,785,613 B2
(45) Date of Patent: Oct. 10, 2023

(54) BASE STATION AND COMMUNICATION METHOD

(71) Applicant: TOYOTA JIDOSHA KABUSHIKI KAISHA, Toyota (JP)

(72) Inventors: Kenichi Takizawa, Koganei (JP); Masafumi Moriyama, Koganei (JP); Fumihide Kojima, Koganei (JP); Atsushi Kurosawa, Fuchu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 179 days.

(21) Appl. No.: 17/498,307

(22) Filed: Oct. 11, 2021

(65) Prior Publication Data

US 2022/0124789 A1    Apr. 21, 2022

(30) Foreign Application Priority Data

Oct. 15, 2020 (JP) ................. 2020-174237

(51) Int. Cl.
*H04W 4/00* (2018.01)
*H04W 72/23* (2023.01)
(Continued)

(52) U.S. Cl.
CPC .......... *H04W 72/23* (2023.01); *H04B 1/0475* (2013.01); *H04B 1/10* (2013.01);
(Continued)

(58) Field of Classification Search
CPC ..... H04W 72/23; H04W 88/08; H04W 28/04; H04W 72/04; H04W 72/042;
(Continued)

(56) References Cited

U.S. PATENT DOCUMENTS 6,426,971 B1 * 7/2002 Wu .................. H04L 1/0002
375/225
2002/0127968 A1 * 9/2002 Takemoto .......... H04B 7/15585
455/24
(Continued)

FOREIGN PATENT DOCUMENTS

JP    2018-121204 A    8/2018
JP    2018-121215 A    8/2018
(Continued)

OTHER PUBLICATIONS

G.J. Foschini et al., "On Limits of Wireless Communication in a Fading Environment When Using Multiple Antennas", Wireless Personal Communications, vol. 6, pp. 311-335, 1998.
(Continued)

*Primary Examiner* — Phuongchau Ba Nguyen
(74) *Attorney, Agent, or Firm* — Finnegan, Henderson, Farabow, Garrett & Dunner, LLP.

(57) ABSTRACT

A base station grants communications of a plurality of wireless communication terminals with the base station without allocating wireless resources upon occurrence of requests for the communications. The base station receives radio signals incoming from the wireless communication terminals and having encoded data, executes a first process of obtaining, from the received radio signals, first signals with at least ones of amplitudes and phases being adjusted, the first signals being incoming from a first wireless communication terminal among the plural wireless communication terminals, a second process of generating replicas of the radio signals incoming from the first wireless communication terminal before at least ones of the amplitudes and the phases are adjusted, a third process of extracting signals given by removing the replicas of the incoming radio signals
(Continued)

from the received radio signals, and a process of iterating the first through third processes successively.

10 Claims, 9 Drawing Sheets

(51) Int. Cl.
    *H04B 1/04*     (2006.01)
    *H04B 1/10*     (2006.01)
    *H04B 1/52*     (2015.01)
    *H04B 7/0452*     (2017.01)

(52) U.S. Cl.
    CPC ............. *H04B 1/52* (2013.01); *H04B 7/0452* (2013.01); *H04B 2001/0491* (2013.01)

(58) Field of Classification Search
    CPC ... H04W 28/08; H04W 28/084; H04W 36/22; H04W 72/12; H04B 1/0475; H04B 1/10; H04B 1/52; H04B 7/0452; H04B 2001/0491; H04B 7/0854; H04B 7/0404; H04J 11/004; H04L 1/20; H04L 5/0007
    See application file for complete search history.

(56) References Cited

U.S. PATENT DOCUMENTS

2019/0132829 A1*   5/2019   Bhattad ............. H04W 72/0453
2020/0146108 A1*   5/2020   Goto .................... H04W 72/23

FOREIGN PATENT DOCUMENTS

JP     2020-014039 A     1/2020
JP     2020-136751 A     8/2020

OTHER PUBLICATIONS

Mohammed Al-Imari et al., "Uplink Non-Orthogonal Multiple Access for 5G Wireless Networks", Proc. of Wireless Communications Systems (ISWCS) 2014 11th International Symposium (ISWCS), pp. 781-785, Oct. 2014.

Kazuki Takeda et al., "NR Physical Layer Specifications in 5G", NTT DoCoMo Technical Journal vol. 26 No. 3, pp. 47-58, Nov. 2018.

Ryo Hayakawa et al., "An Overloaded MIMO Signal Detection Scheme with Slab Decoding and Lattice Reduction", IEICE Technical Report, RCC 2015-16, MICT 2015-16, pp. 77-82, May 2015.

Kenichi Higuchi et al., "Multi Antenna Wireless Transfer Technology III Signal Separation Technology in MIMO Multiplexing Method", NTT DoCoMo Technical Journal vol. 14 No. 1, pp. 66-75, Apr. 2006.

Kazuki Takeda et al., "NR Physical Layer Specifications in 5G", NTT DoCoMo Technical Journal vol. 20 No. 3, pp. 49-51, Jan. 2019.

Ryo Hayakawa et al., "An Overloaded MIMO Signal Detection Scheme with Slab Decoding and Lattice Reduction", Proceedings of APCC2015, IEICE 14 SB 0087, 2015.

Kazuki Takeda et al., "NR Physical Layer Specifications in 5G", NTT DoCoMo Technical Journal vol. 20 No. 3, pp. 49-61, Jan. 2019.

* cited by examiner

| PARAMETER | VALUE |
|---|---|
| NUMBER OF SIMULTANEOUS TRANSMISSION UES | 3 – 6 (TWO RECEPTION ANTENNAS), 5 – 10 (FOUR RECEPTION ANTENNAS) |
| NUMBER OF RECEPTION ANTENNAS | TWO OR FOUR ANTENNAS |
| TRANSMISSION DATA SIZE | 80 bit |
| ERROR CORRECTION CODE (CODED RATE) | TURBO CODE (1/3) |
| MODULATION METHOD | SINGLE CARRIER QPSK |
| TRANSMISSION PATH (MAXIMUM DOPPLER FREQUENCY) | ONE-PATH RAYLEIGH FADING($\fallingdotseq$0Hz) |
| SIGNAL-TO-NOISE-POWER RATIO (SNR) | 30 dB |

BASE STATION AND COMMUNICATION METHOD

CROSS REFERENCE TO THE RELATED APPLICATION

This application claims the benefit of Japanese Patent Application No. 2020-174237, filed on Oct. 15, 2020, which is hereby incorporated by reference herein in its entirety.

BACKGROUND

Technical Field

The present invention pertains to wireless communications.

Description of the Related Art

There are increasingly needs for using terminals connectable to a public network like the Internet for control, and low delay effects of communications to access the public network are demanded. On the other hand, Multiple Input Multiple Output (MIMO) will be utilized from now on into the future. The MIMO is a technology by which a base station and the terminals communicate with each other at a same frequency band via a plurality of antennas respectively. A MIMO-related technology of getting a plurality of terminals (User Equipments) involved in the communications simultaneously is referred to as multi user's MIMO. What is predicted is an increase in number of the terminals accessing the public network, and an apprehension is a tight situation about uplinks.

By the way, communication procedures termed "Configured Grant (CG)" are specified in wireless communications defined as one category of the communications for accessing the public network. Dynamic Grant is exemplified as communication procedures not based on the CG. In the Dynamic Grant, the terminal transmits a Scheduling Request (SR) to the base station when transmitting data to the base station. The base station designates wireless resources usable for the data transmission to the terminal by Downlink Control Information (DCI), and grants the transmission thereof. The terminal receives permission for the transmission, and transmits the data to the base station via the designated wireless resources.

By contrast, according to the CG, a base station previously transmits, to a terminal device, transmission parameters for designating physical resources usable for the data transmission. The base station transmits a start of grant and an end of grant for the data transmission of CG-based accesses. However, transmission parameters of the physical resources and the start of grant are simultaneously transmitted as the case may be. The terminal is thereby enabled to immediately transmit the data to the base station by using the physical resources without transmitting the SR and receiving the DCI. The terminal is thus enabled to transmit the data to the base station with omission of negotiations with the base station in the CG-based communications. The CG is therefore expected as a technology of attaining low delay communications.

PRIOR ART DOCUMENT

Non-Patent Document

[Non-Patent Document 1] "NR Physical Layer Specifications in 5G", Technical Journal Vol. 26 No. 3 (November 2018) of NTT DOCOMO However, a number (N) of the terminals transmitting the data to the base station at the same timing increases due to the CG. A status, in which the number (N) of the terminals transmitting the data to the base station at the same timing is larger than a number M of reception antennas of the base station, is called "overload MIMO". It is an aspect of an embodiment of the disclosure to restrain a communication quality from being deteriorated in such conditions as to cause the overload MIMO easily.

SUMMARY

An embodiment of the disclosure will be exemplified by a base station described below. The base station is a base station configured to grant communications of a plurality of wireless communication terminals with the base station but not to set an upper limit to a number of terminals to be simultaneously connected, the communications being granted without allocating wireless resources based on requests for allocating the wireless resources upon occurrence of requests for the communications with the base station from the plurality of wireless communication terminals.

The base station includes a control unit that executes: receiving modulated radio signals incoming from the plurality of wireless communication terminals; a first process of obtaining, from the received modulated radio signals, first signals with at least ones of amplitudes and phases being adjusted, the first signals being incoming from a first wireless communication terminal of or among the plurality of wireless communication terminals, and obtaining first data being demodulated from the first signals; a second process of generating, based on the first signals or the first data, replicas of the modulated radio signals incoming from the first wireless communication terminal before at least ones of the amplitudes and the phases are adjusted; a third process of extracting signals given by removing the replicas of the incoming radio signals from the received modulated radio signals; and a process of iterating the first through third processes successively by using the extracted signals as the received modulated radio signals and using one of second radio communication terminals other than the first radio communication terminal among the plurality of radio communication terminals as the first wireless communication terminal.

The base station is enabled to restrain the communication quality from being deteriorated in such conditions as to cause the overload MIMO easily.

DESCRIPTION OF THE EMBODIMENTS

Figure 1:
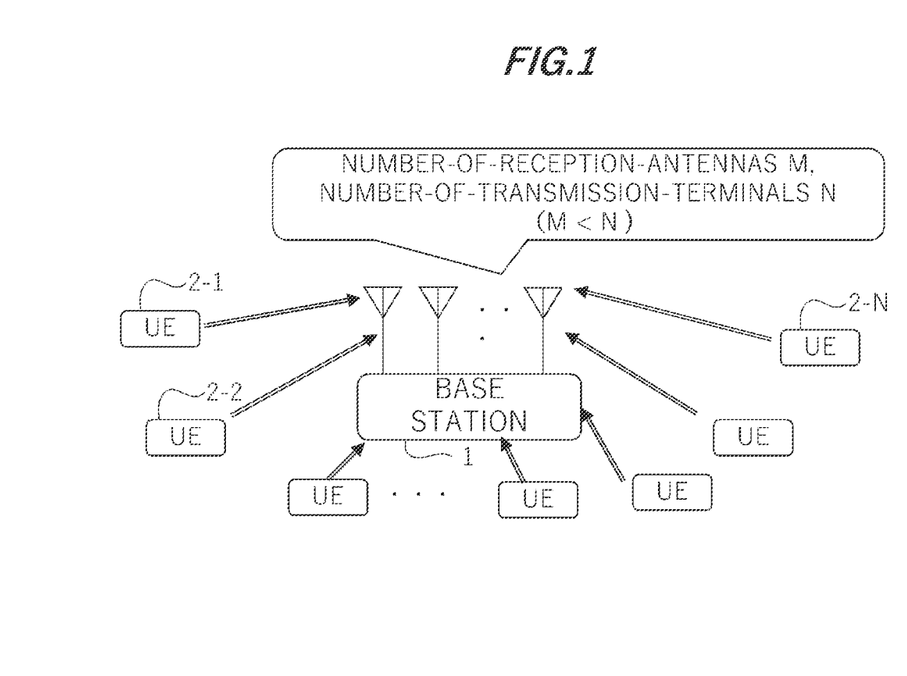
FIG. 1 is a diagram illustrating a configuration of a wireless communication system according to an embodiment.

FIG. 1 is a diagram illustrating a configuration of a wireless communication system according to an embodiment. The wireless communication system includes a base station 1 and a plurality of terminals (User Equipments: UEs) 2-1, 2-2, . . . , 2-N performing wireless communications with the base station 1. The terminals 2-1, . . . will herein be generically termed the "terminals 2". The embodiment will exemplify an overload MIMO wireless communication system with a number-of-terminals N being larger than a number-of-receiving-antennas M at the base station 1 with respect to a multi-user MIMO (MU-MIMO). The terminals 2 may be referred to as wireless communication terminals.

When reaching the overload MIMO, a communication quality (QoS) gets deteriorated. This is because the MU-MIMO is unable to remove all of interference signals upon reaching the overload MIMO. It is predicted that there will be a further increased number of terminals having accesses to networks due to Internet of Things (IoT) from now onward. It is therefore considered that there will be a decreased number of terminals enabled to set CG (Configured Grant). As a result, it follows that there are a limited number of terminals enabled to perform low-delay communications. Such being the case, the embodiment will exemplify a communication system enabled to restrain the communication quality from being deteriorated even in a status of the overload MIMO.

The embodiment will disclose a base station 1 configured to grant the wireless communication terminals to perform the communications with the base station 1 without being allocated with wireless resources based on requests for allocations of the wireless resources when plural wireless communication terminals 2 make requests for the communications with the base station 1, but not to establish an upper limit to the number of terminals, which are simultaneously connected. However, the embodiment will also disclose a communication method to be carried out by the base station 1. Herein, CG-based communications may be given by way of one example of the communications of the wireless communication terminals with the base station 1 without being allocated with the wireless resources based on the requests for allocations of the wireless resources when the plural wireless communication terminals make the requests for the communications with the base station 1.

The base station 1 includes a control unit controlling to receive modulated radio signals coming from the plurality of wireless communication terminals. The control unit executes first through third processes given as follows. The incoming radio signals are herein defined as reception signals before being received by the base station 1.

Herein, the first process is that the control unit obtains, from the received radio signals, first signals with at least ones of amplitudes and phases being adjusted, the first signals coming from a first wireless communication terminal of or among the plural wireless communication terminals, and obtains first data being demodulated from the first signals. The first signals with at least ones of the amplitudes and the phases being adjusted are exemplified by signals with suppressed radio signals coming from the wireless communication terminals other than the first wireless communication terminal, but with the radio signals remained to the greatest possible degree, which come from the first wireless communication terminal.

The second process is that the control unit generates, based on the first signals or the first data, replicas of the radio signals coming from the first wireless communication terminal before at least ones of the amplitudes and the phases are adjusted. In other words, the control unit generates signals simulating the pre-receiving radio signals coming from the first wireless communication terminal.

The third process is that the control unit extracts signals given by removing the replicas of the incoming radio signals from the received radio signals. The signals given by removing the replicas of the incoming radio signals from the received radio signals may be referred to as residual signals. In short, the control unit extracts the radio signals coming from the wireless communication terminals other than the first wireless communication terminal.

The control unit sequentially executes iterations of the first through third processes with respect to the extracted signals, in which one of second wireless communication terminals exclusive of the first wireless communication terminal of or among the plural wireless communication terminals serves as the first wireless communication terminal. Thus;

(1) the requests for allocating the wireless resources are not made when the communication requests for the base station 1 occur from the plural wireless communication terminals, and;

(2) the wireless resources are not allocated based on the allocation requests.

The radio signals transmitted from such plural wireless communication terminals as the above are demultiplexed into signals of the individual wireless communication terminals. This process includes demultiplexing well the signals of the individual wireless communication terminals even when the number of the wireless communication terminals performing the simultaneous communications exceeds a permissible limit, e.g., a number of receiving antennas of the base station 1.

The first process includes a diversity process of obtaining the radio signals coming from the first wireless communication terminal through at least ones of plural different incoming routes and plural different incoming periods of time. The first through third processes are combined with the diversity process, thereby demultiplexing well the signals of the plural wireless communication terminals.

The control unit may execute the process of iterating the first through third processes when granting the wireless communication terminals to communicate with the base station 1 in a system of performing the communications by not allocating the wireless resources to at least one of the plural wireless communication terminals. When granting the wireless communication terminals to communicate with the base station 1 without allocating the wireless resources, the number of the wireless communication terminals performing the simultaneous communications with the base station 1 gets easy to exceed the permissible limit. The process of iterating the first through third processes is effective in the communications, with the base station 1, of the wireless communication terminals, of which the number exceeds the permissible limit given above.

When in such a system of performing the communications that the base station 1 does not allocate the wireless resources to at least one of the plural wireless communication terminals, the base station 1 does not establish the upper limit to the number of terminals to be set on the occasion of setting the number of the wireless communication terminals enabled to transmit the radio signals simultaneously. Even in the case of not establishing the upper limit described above, the base station 1 is enabled to receive the signals from the plurality of wireless communication terminals by restraining a rise of packet error rate.

The base station 1 carries out, with respect to the first data, an encoding process, a modulating process, a transmission diversity process and a process of reflecting statuses of transmission paths between the plurality of wireless communication terminals and the base station 1, thereby generating the replicas of the incoming radio signals. The first data encoded and modulated by the first wireless communication terminal are well decoded and demodulated, in which case the control unit uses the decoded and demodulated first data and is thereby enabled to generate the replicas of the incoming radio signals at high accuracy. This is because the radio signals coming from the wireless communication terminals, of which the number exceeds the permissible limit, come to have a status with a signal-to-interference-noise ratio being low as the case may be.

Figure 2:
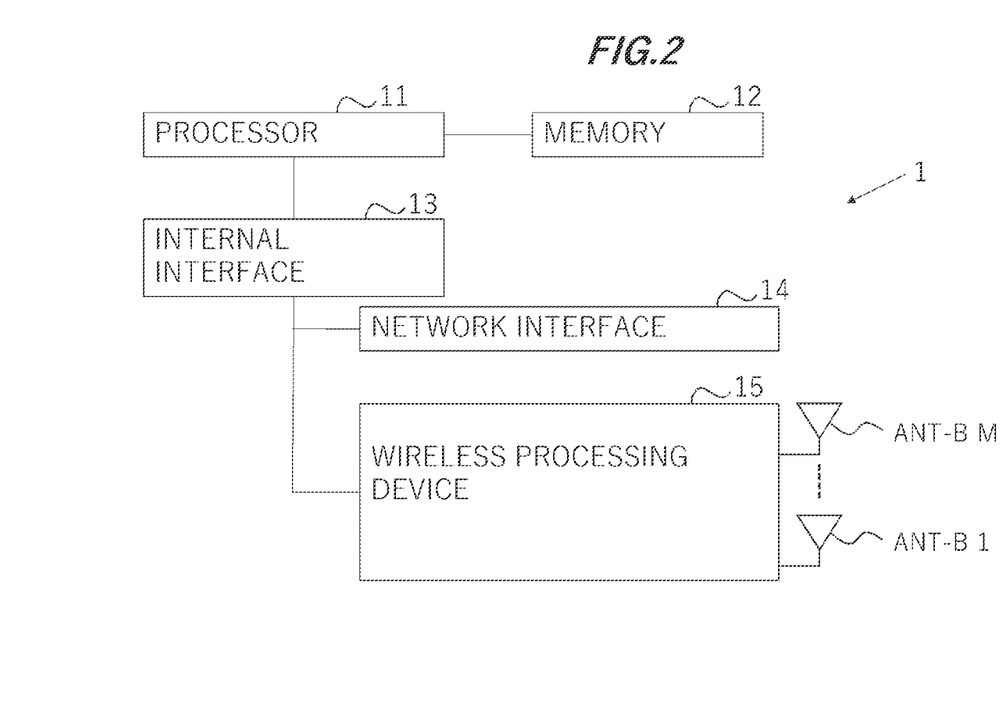
FIG. 2 is a diagram illustrating a hardware configuration of a base station according to the embodiment.

FIG. 2 is a diagram illustrating a hardware configuration of a base station 1 according to the embodiment. The base station 1 includes a processor 11, a memory 12, an internal interface 13, a network interface 14 for communicating with other base stations etc., and a wireless processing device 15.

The processor 11 is also referred to as a Central Processing Unit (CPU) or a Microprocessor (Micro Processing) Unit (MPU). It does not mean that the processor 11 is limited to a single processor, but the processor 11 may also take a multi-processor configuration. A single physical CPU connected by a single socket may have a multi-core configuration. The processor 11 may further include arithmetic units having a variety of circuit configurations as exemplified by a Digital Signal Processor (DSP) and a Graphics Processing Unit (GPU). The processor 11 may also be configured to cooperate with Integrated Circuit (IC) and other digital circuits or analog circuits. The IC may also be configured to include an LSI, an Application Specific Integrated Circuit (ASIC) and a Programmable Logic Device (PLD). The PLD may also be configured to include, e.g., a Field-Programmable Gate Array (FPGA). The processor 11 may therefore be what is referred to as, e.g., a Micro-Control Unit (MCU), an SoC (System-on-a-chip), a system LSI and a chipset.

The memory 12 stores command strings (computer programs) run by the processor 11, or stores data and other equivalents processed by the processor 11. The processor 11 and the memory 12 may also be called a Base Band Unit (BBU) in some cases. The internal interface 13 is defined as a circuit that connects a variety of peripheral devices to the processor 11. The BBU may also be referred to as a control unit.

The network interface 14 is a communication device via which the base station 1 accesses a network to which other base stations are connected. The network receiving the connections of other base stations is also called a backhaul. The backhaul is defined as, e.g., a wired network based on optical communications.

The wireless processing device 15 includes a transceiver to transmit the radio signals and a receiver to receive the radio signals, and is connected to antennas ANT-B1, ..., ANT-BM. The wireless processing device 15 may have the same number of N-lines comprising the transceivers and the receivers as the number of antennas. The wireless processing device 15, which is referred to as a Remote Radio Head (RRH), may also be configured to be set up remotely by connecting to the BBU via the wired network based on the optical communications. Another available configuration is that a plurality of RRHs is connected to one BBU. Note that a network for connecting the RRHs to the BBU is also called a fronthaul.

Figure 3:
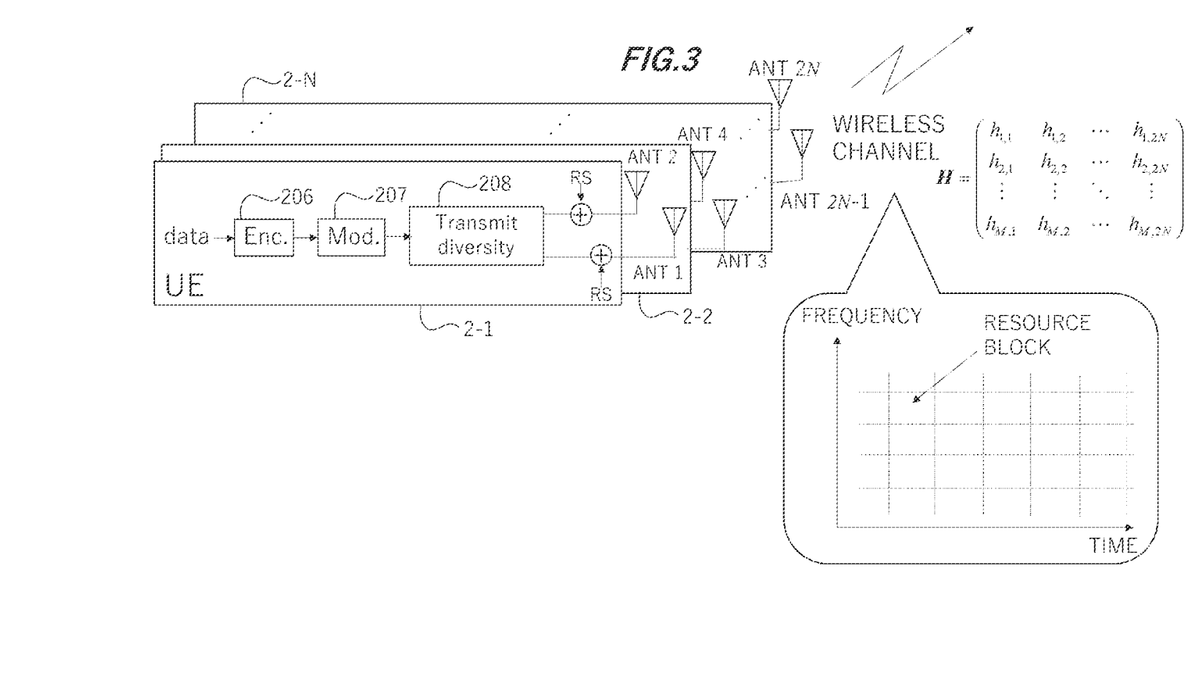
FIG. 3 is a block diagram illustrating a configuration of a terminal.

FIG. 3 is a block diagram illustrating a configuration of a terminal 2. FIG. 3 depicts resource blocks and a wireless channel matrix H. The wireless resource block corresponds to a portion segmented by a frequency axis of subcarriers and a time axis, the portion being allocated to the terminal 2. The channel matrix H is a matrix representing variation quantities of amplitudes and phases of transmission paths between the respective antennas ANT 1, ANT 2, ... of the terminal 2 and the receiving antennas ANT-B1 through ANT-BM of the base station 1. It is feasible to obtain estimated values of vectors of receiving signals at the receiving antennas ANT-B1 through ANT-BM of the base station 1 by multiplying vectors of transmitting signals of the respective antennas ANT 1, ANT 2, ... of the terminal 2 on a transmission side by the channel matrix H.

FIG. 3 illustrates a plurality of terminals 2-1, ..., 2-N. A detailed configuration of the terminal 2 is illustratively exemplified by the terminal 2-1. In FIG. 3, each terminal 2 includes pairs of antennas ANT 1, ANT 2, ..., ANT 2N-1, ANT 2N. In the following description, the antennas of the respective terminals 2 are, when generically termed, simply described as the antennas ANT. In the embodiment, however, it does not mean that a number of antennas of each terminal 2 is limited to "2".

The terminal 2 is also referred to as a User Equipment (UE). The UE 2 includes a processor, a memory, a wireless processing device and antennas ANT. The processor, the memory and the wireless processing device of the UE 2 are similar to the processor 11, the memory 12 and the wireless processing device 15 described in FIG. 2. In the UE 2, however, the processor, the memory and the wireless processing device are generally housed in one single housing. The processor of the UE 2 executes, based on command strings (computer programs) deployed in an executable manner on the memory, a wireless communication process including respective processes of an encoder 206, a modulator 207 and a transmission diversity processing unit 208.

The encoder 206 error-correction-encodes the data transmitted from the UE 2. The error-correction code may also be either a soft decision code or a hard decision code, and there is no restriction on types of encoding. The modulator 207 digital-modulates the error-correction encoded data. A digital modulation method is exemplified by Quadrature Amplitude Modulation (QAM), Phase Shift Keying (PSK) and Frequency Shift Keying (FSK).

The transmission diversity processing unit 208 separates the digital-modulated signal into a plurality of signals and thus builds branches of the transmission diversity, and the separated signals are radiated from the plurality of antennas ANT via the wireless processing device. In an example of FIG. 3, the transmission diversity processing unit 208 of each UE 2 separates the transmission path by the two antennas and thus builds the branches of the transmission diversity. In the embodiment, however, it does not mean that processing by the transmission diversity processing unit 208 is limited to the diversity based on the plurality of antennas. For instance, the UE 2 has the single antenna, in which case a diversity process 20 may adopt a polarization diversity, a time diversity, a frequency diversity, and other equivalents. The diversity process according to the embodiment has no limitation but may adopt a variety of diversities. In other words, the processing by the transmission diversity processing unit 208 according to the embodiment may be said to be one example of the diversity processes acquired by at least ones of the plural different incoming paths and different incoming periods of time of the radio signals coming from the wireless communication terminals.

Figure 4:
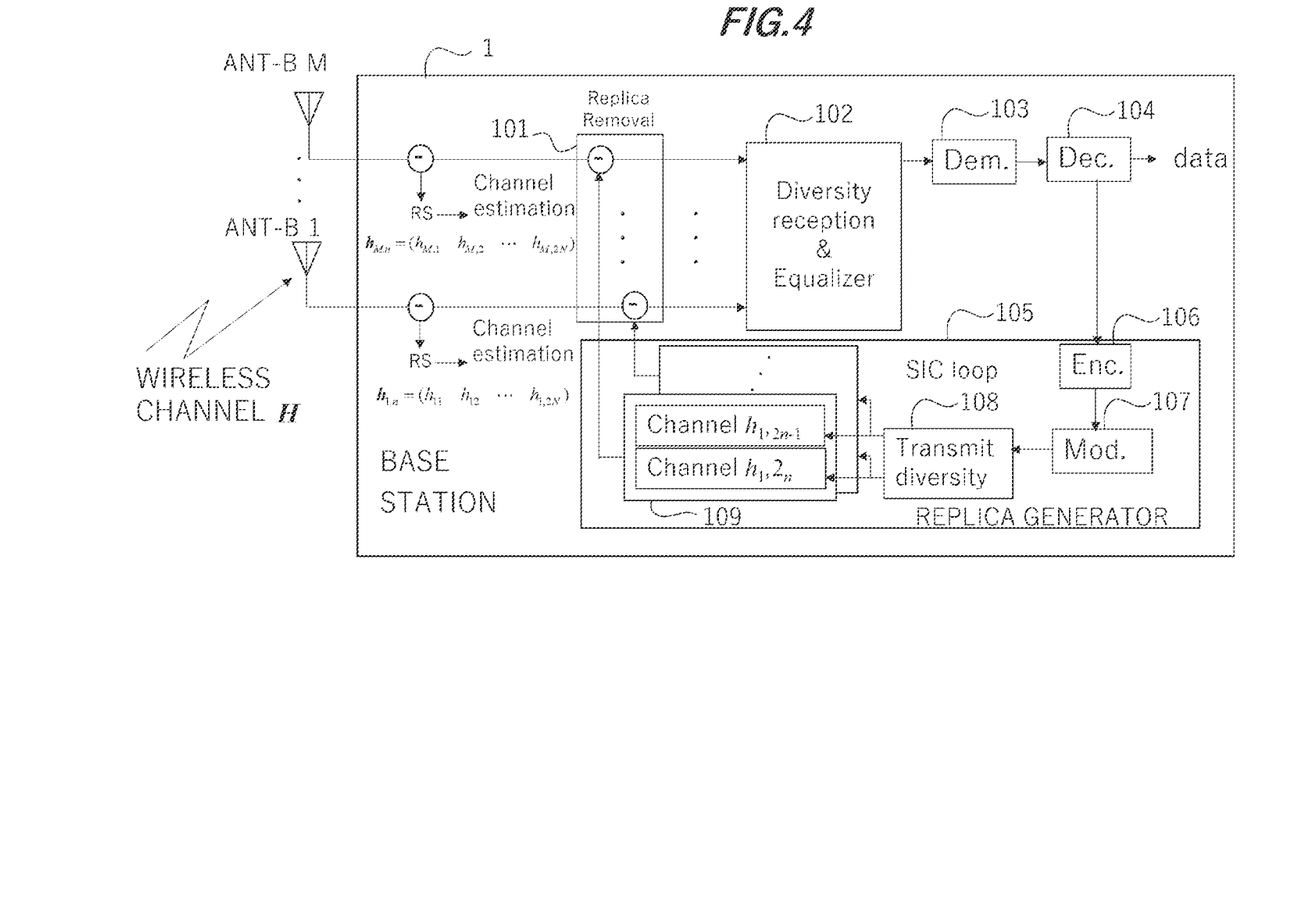
FIG. 4 is a block diagram illustrating a configuration of the base station.

FIG. 4 is a block diagram illustrating a configuration of the base station 1. The base station 1 includes a replica removal unit 101, a diversity reception/equalizer 102, a demodulator 103, a decoder 104, and a replica generation unit 105. The replica generation unit 105 includes an encoder 106, a modulator 107, a transmission diversity processing unit 108, and a channel matrix multiplier 109. The processor 11 illustrated in FIG. 2 executes, based on the command strings (computer programs) deployed in the executable manner on the memory 12, the respective processes of the replica removal unit 101, the diversity reception/equalizer 102, the demodulator 103, the decoder 104, the replica generation unit 105, the encoder 106, the modulator 107, the transmission diversity processing unit 108 and the channel matrix multiplier 109.

FIG. 4 illustrates the channel matrix H together with the configuration of the base station 1. A structure of the channel matrix H is common to the channel structure in FIG. 3. The channel matrix H is a matrix representing the variation quantities of the amplitudes and the phases of the transmission paths between the respective antennas ANT 1, ANT 2, . . . of the UE 2 and the antennas ANT-B1 through ANT-BM of the base station 1. The channel matrix H is determined by receiving, at the antennas ANT-B1, . . . , ANT-BM, reference signals (RS) transmitted from antennas ANT2K-1, ANT2K (K=1, . . . , N) of the respective UEs 2. This is the same with a case in which the number of the antennas of each UE 2 is different from "2". In short, the variation quantities corresponding to transfer functions of the transmission paths are obtained based on the reference signals transmitted and received between the antennas ANT K on the transmitting side and the antennas ANT-BK on a receiving side.

In the communication system according to the embodiment, the reference signals RS are transmitted based on the same resource blocks as the resource blocks used in the CG. However, the reference signals RS may also be transmitted based on resource blocks different from the resource blocks used in the CG. In the embodiment, the reference signals RS are transmitted based on the same resource blocks as the resource blocks used in the CG, and hence the reference signals RS coming from the transmission antennas ANT of the respective UEs 2 are orthogonal in order not to cause mutual interferences of the reference signals RS between or among the plural UEs 2. A method of how the reference signals RS are set orthogonal may be exemplified by a Time Division Multiple Access (TDMA) method of not causing timewise overlap, a Frequency Division Multiple Access (FDMA) method of dividedly shifting frequencies, and a Code Division Multiple Access (CDMA) method of using codes orthogonal to each other. The embodiment adopts, e.g., the CDMA. When setting the CG, the base station 1 allocates mutually-different codes to the respective UEs 2 as the codes used for the reference signals RS. The reference signals RS are added before and after the data (Data Signal: DS) transmitted from the UE 2. The reference signals RS are orthogonal, and the base station 1 is thereby enabled to measure the channel matrix H by demultiplexing the respective signals of the reference signals RS even in an overload MIMO status. In the embodiment, the description will be made on the assumption that the base station 1 will already have measured the latest channel matrix H at all times.

In the embodiment, the antennas ANT-B1 through ANT-BM receive the radio signals at the overlapped resource blocks, which are transmitted simultaneously from the N-numbered UEs 2 larger than a number-of-antennas M (overload MIMO). The signals coming from the plurality of UEs 2 interfere with each other at the respective antennas ANT-B1 through ANT-BM. The transmission diversity does not produce any effect in the overload MIMO status. Such being the case, the processor 11 of the base station 1 according to the embodiment repeatedly executes MMSE (Minimum Mean-Squared Error) equalization and Successive Interference Canceller (SIC) of successively removing interference replicas of the transmission signals.

In the SIC, the processor 11, at first, obtains reception signals s1, s2 coming from transmission branches 1, 2 (the antennas ANT-1, ANT-2 of the UE 2-1) through the MMSE equalization. Next, the processor 11 generates interference replicas r1($i$), r2($i$), ($i$=1, . . . , M) given from the transmission branches 1, 2 (the antennas ANT-1, ANT-2) corresponding to the reception signals s1, s2. The interference replicas r1($i$), r2($i$) are defined as estimated values of the reception signals coming from the transmission branches 1, 2 (the antennas ANT-1, ANT-2) before the MMSE equalization, which are received at the reception antennas ANT-B$i$.

The processor 11 removes the interference replicas r1($i$), r2($i$), ($i$=1, . . . , M) from the reception signals at the antennas ANT-B1 through ANT-BM. At the antennas ANT-B1 through ANT-BM, the processor 11 is thereby enabled to acquire the reception signals not affected by the transmission signals coming from the transmission branches 1, 2 (the antennas ANT-1, ANT-2). Hereinafter, the SIC process is repeatedly executed with respect to transmission branches 2$j$-1, 2$j$ (the antennas ANT-2$j$-1, ANT-2$j$ of the UE 2-$j$) ($j$=2, . . . , N) successively. To be specific, the same process is iterated in a loop j with respect to the reception signals, with the transmission signals coming from the UE 2-1 through the UE 2-$j$–1 being removed. Owing to such control of the processor 11, the reception signals coming from the antennas ANT1, ANT2, . . . , ANT2N-1, ANT2N of each individual UE 2 are successively obtained with respect to the radio signals received in the overload MIMO.

The replica removal unit 101 subtracts the interference replicas r1(1), r2(2) through 2$j$-3($i$), r2$j$-2($i$), ($i$=1, . . . , M) of the UE 2-1 through the UE 2-$j$–1 in an j-th SIC loop from the reception signals s($i$), ($i$=1, . . . , M) received at the reception antennas ANT-B1 through ANT-BM. The processing by the replica removal unit 101 may be said to be a third process of extracting the signals by removing the replicas of the incoming radio signals being removed from the received modulated radio signals.

The diversity reception/equalizer 102 suppresses the interferences other than the focused UE 2-$j$ (the transmission antennas ANT-2$j$-1, ANT-2$j$) by the MMSE method. The diversity reception/equalizer 102 acquires the reception signals coming from the focused UE 2-$j$ (the transmission antennas ANT-2$j$-1, ANT-2$j$) at the reception antennas ANT-B1 through ANT-BM respectively. In other words, the diversity reception/equalizer 102 calculates an MMSE weight W matrix from the channel matrix H and an Hermitean transposed matrix $H^H$ thereof by the following formula (1).

$$W = H^H \{HH^H + NI\}^{-1}; \qquad \text{(Formula 1)}$$

where "I" is a unit matrix having M-rows and M-columns.

The diversity reception/equalizer 102 multiplies the reception signals s(i), (i=1, . . . , M) received at the reception antennas ANT-B1 through ANT-BM by the MMSE weight W matrix. The diversity reception/equalizer 102 thereby executes the equalization process of suppressing the interferences from other transmission antennas with respect to the signals coming from the transmission antennas ANT-2*j*-1, ANT-2*j* of each UE 2-*j*. In the j-th loop of each SIC, the diversity reception/equalizer 102 acquires, from an arithmetic result of (Formula 1), the UE 2 having the strongest signals (good-conditioned signals) among the UEs 2 exclusive of the UEs 2-1 through the UE 2-*j*-1 that are to be already removed in the first through (j-1)-th loops. The diversity reception/equalizer 102 determines the UE 2-*j* to be selected in the j-th loop. The diversity reception/equalizer 102 executes the receiving process based on the transmission diversity by employing the plurality of branches from the thus-determined single UE 2-*j*. The diversity reception/equalizer 102 therefore selects the UE 2 having the strongest signal (good-conditioned signal) at any one of the branches, as the above-mentioned UE 2 having the strongest signal. The process of obtaining the signals coming from the UE 2 having the strongest signal through the MMSE equalization may be said to be a process of obtaining, from the received modulated radio signals, the first signals with at least ones of amplitudes and phases being adjusted, the first signals being incoming from the first wireless communication terminal of or among the plurality of wireless communication terminals.

The demodulator 103 generates bit strings from the reception signals acquired by the diversity reception/equalizer 102. The decoder 104 decodes error correction codes from the bit strings obtained by the demodulator 103, thereby acquiring the data. The processing by the diversity reception/equalizer 102 and the demodulator 103 may be said to be a first process of obtaining, from the received modulated radio signals, first signals with at least ones of the amplitudes and the phases being adjusted, the first signals being incoming from the first wireless communication terminal of or among the plurality of wireless communication terminals, and obtaining first data being demodulated from the first signals.

The replica generation unit 105 generates, based on the decoded signals coming from the UE 2, interference replicas transmitted from the antennas ANT2*j*-1, ANT2*j* of the UE 2 and received at the reception antennas ANT-B1 through ANT-BM.

Namely as shown in FIG. 4, the encoder 106 again error-correction-encodes the data transmitted from the UE 2. The modulator 107 digital-modulates the error-correction-encoded data. The transmission diversity processing unit 108 executes the same transmission diversity process as the process of the UE 2. The channel matrix multiplier 109 multiplies the transmission signals that are transmission-diversity-processed and to be transmitted from the respective transmission branches of the UE 2 by the channel matrix. With this multiplication, the interference replicas received at the reception antennas ANT-B1 through ANT-BM are generated. The data decoded by the decoder 104 may be said to be the first data decoded from the first signals. It may therefore be said that the replica generation unit 105 carries out, with respect to the first data, the encoding process, the modulation process, the transmission diversity process and a process of reflecting statuses of the transmission paths between the plurality of wireless communication terminals and the base station 1, and thereby generates the replicas of the incoming radio signals. The processing by the replica generation unit 105 may be said to be a second process of generating the replicas of the incoming modulated radio signals.

Figure 5:
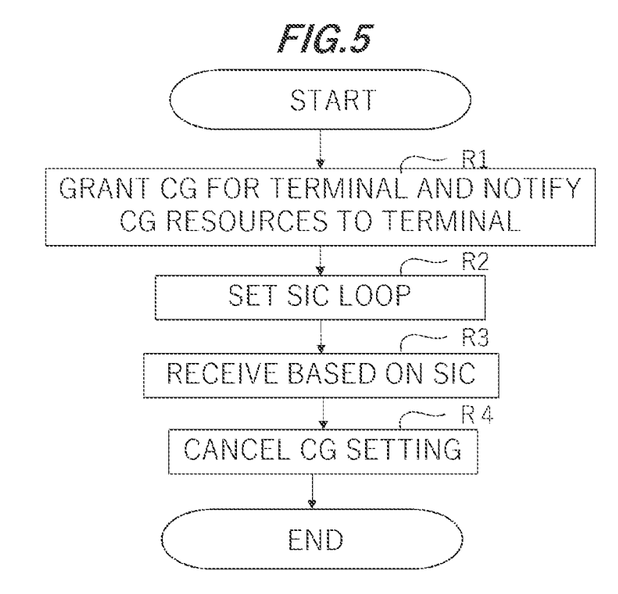
FIG. 5 is a flowchart illustrating a CG-based process of the base station.

FIG. 5 is a flowchart illustrating a CG-based process of the base station 1. In this process, the processor 11 grants the CG for the UE 2 when establishing a connection to the UE 2, and designates the resources used for the CG and the reference signals RS different on a UE-by-UE basis (R1). Herein, the time when establishing the connection is exemplified by when the base station 1 establishes the connection to the UE 2 in accordance with procedures called signaling or when performing initial settings.

Next, the processor 11 performs setting for receiving the SIC loop within the base station 1 (R2). In the SIC loop, for example, the processor 11 stores relationships between the reference signals RS designated to the UEs 2 and pieces of identifying information of the UEs 2 in the memory 12 in order to identify the UEs 2 by checking the reference signals RS received from the UEs 2. The processor 11 determines a number of the SIC loops and also stores the number of SIC loops in the memory 12. Note that the embodiment in the process R2 does not set an upper limit to the number of the UEs capable of simultaneously transmitting the radio signals when in such a communication system that the base station 1 does not allocate the wireless resources to at least one of the plural UEs 2.

Subsequently, the processor 11 receives the signals from the UEs 2 on the basis of the CG (R3). Note that the processor 11, with the reception of the signals from the UEs 2, properly sends back responses (acknowledgement ACK, negative-acknowledgement NACK) given from the base station 1. When the base station 1 opens the connection to the UE 2, the processor 11 cancels the setting of the CG (R4), and terminates the processing. According to the processes described so far, when the base station 1 grants the CG for the UE 2, the processor 11 makes the settings for receiving the SIC loop within the base station 1. It may therefore be said that the processor 11 executes the SIC loop when granting the communications of the plurality of UEs 2 with the base station 1 without allocating the wireless resources to at least one of the plural wireless communication terminals.

Figure 6:
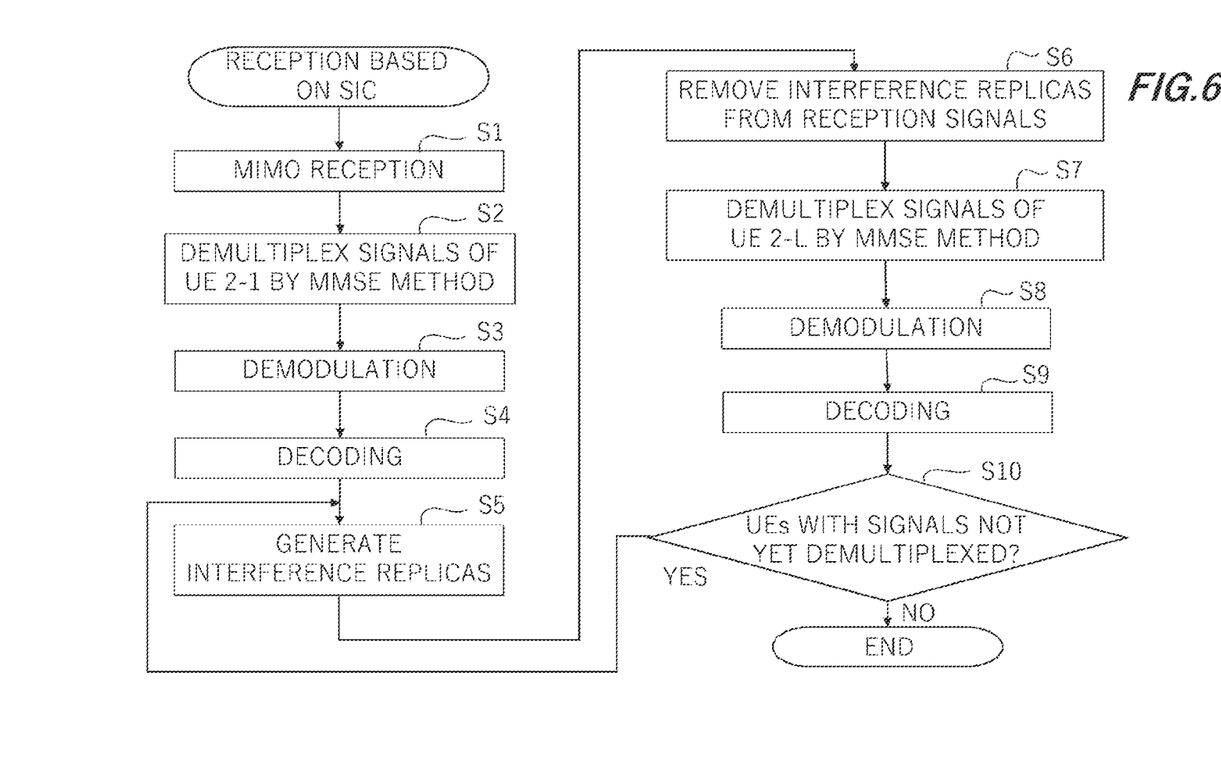
FIG. 6 is a flowchart illustrating procedures of a CG-based reception process with the terminal in the base station.

FIG. 6 is a flowchart illustrating procedures of the reception process (R3 in FIG. 5) based on the CG with the UE 2 in the base station 1. In this process, the processor 11 acquires the overload MIMO reception signals received at the reception antennas ANT-B1 through ANT-BM and by the wireless processing device 15 (S1). Next, the processor 11 acquires the signals transmitted from the UE 2-1 having the branch of the strongest (good-conditioned) signals by the MMSE method (S2). The UE 2-1 transmits the signals by the transmission diversity, and hence the processor 11 acquires, based on the plurality of transmission branches, modulated carrier signals transmitted from the UE 2-1. The processor 11 executes the process in S2 as the diversity reception/equalizer 102. The process in S2 may be said to be a process of obtaining, from the received modulated radio signals, the first signals with the amplitudes or the phases being adjusted, the first signals being incoming from the first wireless communication terminal of or among the plural wireless communication terminals. The UE 2-1 having the branch of the strongest (good-conditioned) signals may be said to be the first wireless communication terminal. Acquiring the signals transmitted from the UE 2-1 having the branch of the strongest (good-conditioned) signals by the MMSE method, may be said to be one example of obtaining the first signals with the amplitudes or the phases being adjusted that are given from the first wireless communication terminal of or among the plural wireless communication terminals.

The processor 11 executes a digital demodulation process on the basis of the signals acquired in the process of S2 (S3). To be specific, the processor 11 fetches the bit strings as baseband signals from the modulated carrier signals. The processor 11 executes the process in S3 as the demodulator 103. Subsequently, the processor 11 decodes the data from the error-correction-encoded signals defined as the baseband signals demodulated in the process of S3 (S4). The processor 11 executes a process in S4 as the decoder 104. The data encoded and modulated by the UE 2 and carried on the modulated carriers are demodulated and decoded from the reception signals in the processes of S2 through S4. Accordingly, the processes in S2 through S4 may be generically said to be the first process.

Next, the processor 11 generates the interference replicas of the radio signals coming from the transmission branches (transmission antennas) of the UE 2-1 (S5). The processor 11 executes the process in S5 as the replica generation unit 105. The process in S5 may be said to be a second process. The interference replicas may be said to be replicas of the incoming radio signals.

Subsequently, the processor 11 removes the interference replicas from the reception signals received at the reception antennas ANT-B1 through ANT-BM and by the wireless processing device 15 (S6). The process in S6 may be said to be a third process. The signals with the interference replicas being removed from the reception signals may be said to be residual signals. Note that processes in S6 through S9 are iterated till the signals of all the UE 2-$j$ ($j$=1, . . . , N) are demultiplexed. In the process of S6 in the loop j to demultiplex the signals of the UE 2-$j$, the interference replicas associated with the UE 2-1 through UE 2-$j$−1 are therefore removed from the reception signals. It is hereinafter assumed that the processor 11 is currently in the midst of processing the j-th loop.

Next, the processor 11 demultiplexes the transmission signals coming from the UE 2-$j$ (S7) and performs the diversity process about the signals. Then, the processor 11 performs demodulating (S8) and decoding (S9). The processor 11 determines whether some number of UEs 2 with the signals not yet demultiplexed are left (S10). If some number of UEs 2 with the signals not yet demultiplexed are left (YES), the processor 11 loops the processing back to S5. Whereas if none of the UEs 2 with the signals not yet demultiplexed are left after completing the processes of the whole UEs 2 (NO), the processor 11 finishes the processing.

Figure 7:
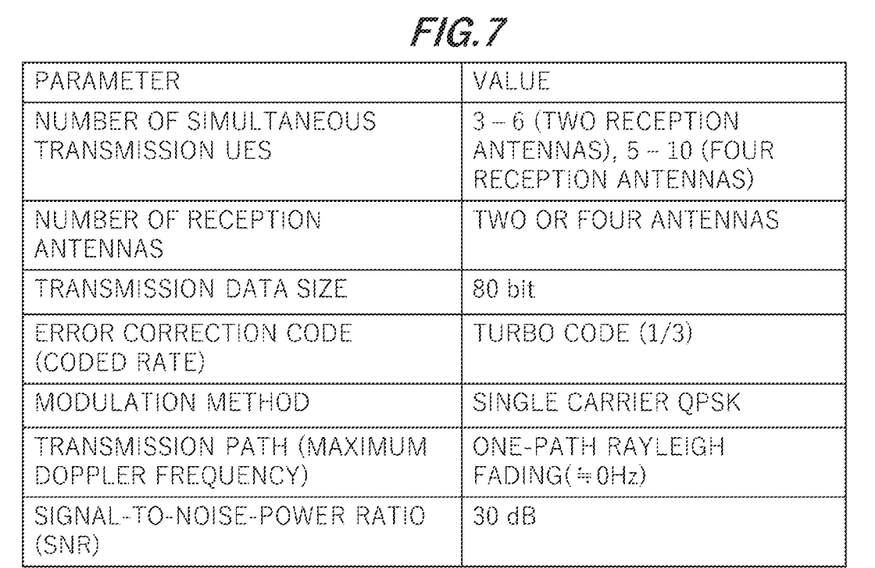
FIG. 7 is a table illustrating conditions of a simulation.
Figure 8:
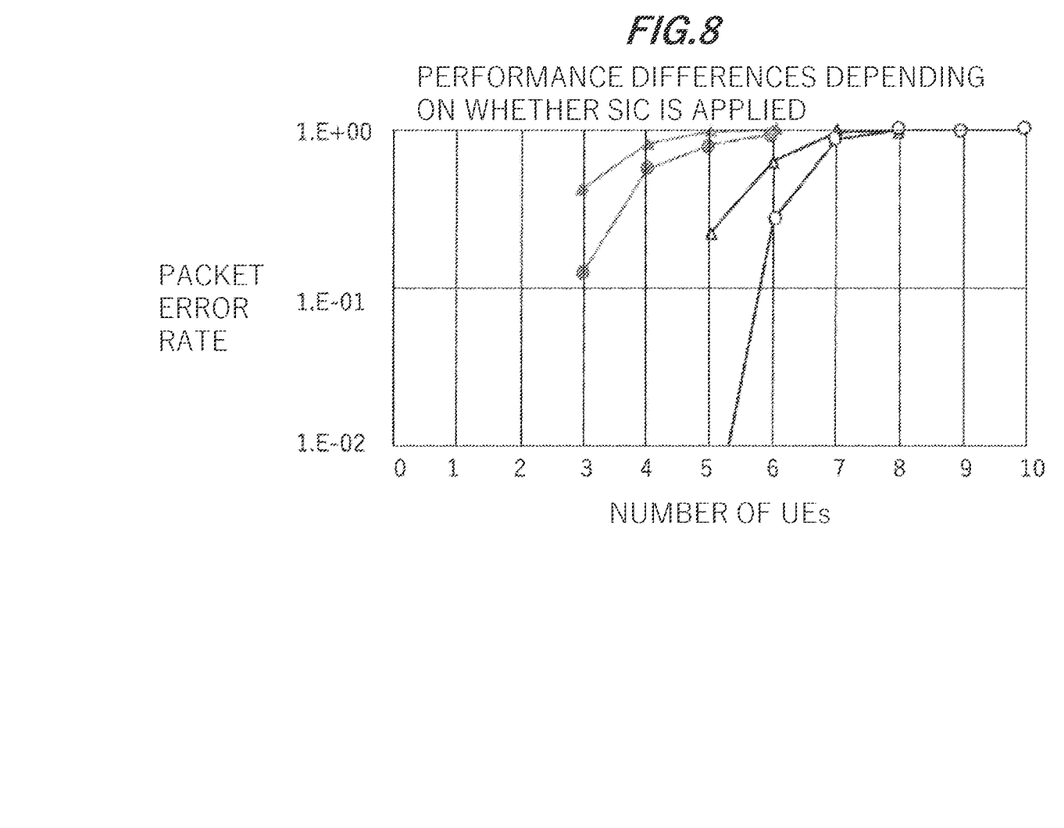
FIG. 8 is a graphic chart illustrating differences of a packet error rate, depending on whether SIC is applied in the simulation.
Figure 9:
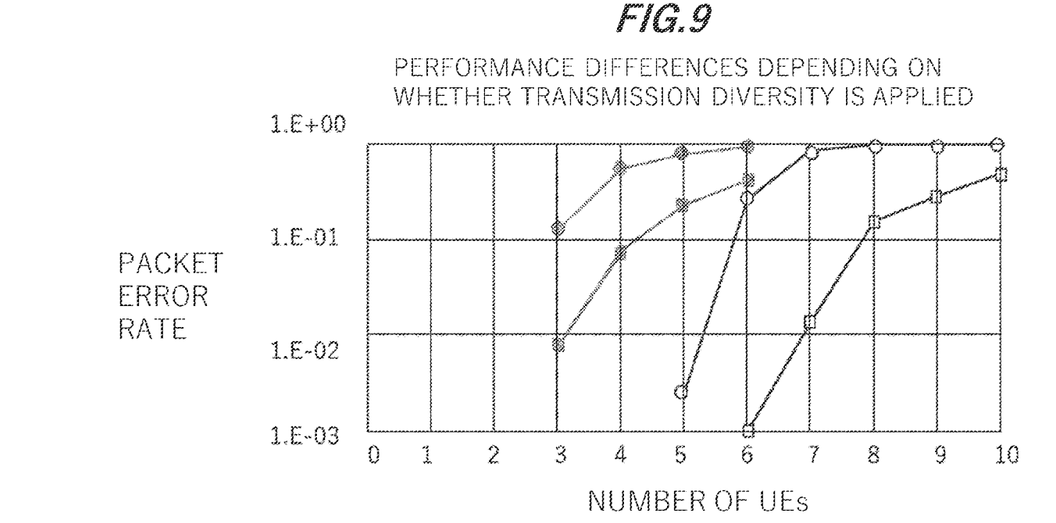
FIG. 9 is a graphic chart illustrating differences of the packet error rate, depending on whether transmission diversity is applied in addition to the SIC applied in the simulation.

FIGS. 7 through 9 illustrate results of simulations in the processes according to the embodiment. FIG. 7 depicts conditions of the simulation. The simulations are conducted respectively in a case where figures of the number of the simultaneous transmission terminals are 3 through 6 (two transmission antennas of each UE 2) and in a case where the figures of the number of the simultaneous transmission terminals are 5 through 10 (four transmission antennas of each UE 2).

A transmission data size has 80 bits. The error correction codes are defined as turbo codes (coded rate 1/3). The modulation method is single carrier QPSK. One-path Rayleigh fading of a maximum Doppler frequency 0 Hz is assumed for the transmission path. Further, 30 dB is assumed as a signal-to-noise power ratio of the transmission path.

FIG. 8 illustrates differences of the packet error rate, depending on whether the SIC is applied in the simulation. Each of graphs in FIG. 8 corresponds to an example of having no transmission diversity in every case. In FIG. 8, an axis of abscissa indicates the number of terminals, while an axis of ordinate indicates the packet error rate. In FIG. 8, each of blackened triangular marks corresponds to a case of not implementing the SIC when a figure of the number of reception antennas is "2", while each of blackened circular marks corresponds a case of implementing the SIC when the figure of the number of reception antennas is "2". In the case of not implementing the SIC, the number of transmission terminals is "3", and, when exceeding "2" that is the number of reception antennas, the packet error rate worsens to a value exceeding "0.5". Whereas when implementing the SIC, it is recognized that the packet error rate can be restrained to about "0.1" even in the case of exceeding "2" that is the number of reception antennas when the number of transmission terminals is "3".

In FIG. 8, each of whitened triangular marks corresponds to the case of not implementing the SIC when the number of reception antennas is "4", while each of the whitened circular marks corresponds to the case of implementing the SIC when the number of reception antennas is "4". In the case of not implementing the SIC, the number of transmission terminals is "5", and, when exceeding "4" that is the number of reception antennas, the packet error rate worsens to a value exceeding "0.2". Whereas when implementing the SIC, it is recognized that the packet error rate can be restrained to less than "0.01" even in the case of exceeding "4" that is the number of reception antennas when the number of transmission terminals is "5".

FIG. 9 illustrates differences of the packet error rate, depending on whether the transmission diversity is applied in addition to the SIC applied in the simulation. To be specific, the SIC is implemented in every case with respect to each of graphs of FIG. 9. In FIG. 9, each of blackened circular marks corresponds to a case of not carrying out the transmission diversity when the number of reception antennas is "2", while each of blackened square marks corresponds to a case of carrying out the transmission diversity when the number of reception antennas is "2". It is understood that the packet error rate can be improved by carrying out the transmission diversity together with the SIC. It is recognized that the packet error rate can be restrained to about "0.01" even in the case of exceeding "2" that is the number of reception antennas when the number of transmission terminals is, e.g., "3".

Further, In FIG. 9, each of whitened circular marks corresponds to a case of not carrying out the transmission diversity when the number of reception antennas is "4", while each of whitened square marks corresponds to a case of carrying out the transmission diversity when the number of reception antennas is "4". It is understood that the packet error rate can be improved by carrying out the transmission diversity together with the SIC. It is recognized that the packet error rate can be restrained to about "0.001" even when the number of transmission terminals is, e.g., "6". It is also recognized that the packet error rate can be restrained to about "0.01" even when the number of transmission terminals is "7".

As discussed above, the communication system according to the embodiment enables the highly efficient wireless communications to be attained, which are configured to restrain the packet error rate, by demultiplexing the signals coming from the individual UEs 2 owing to the SIC in the overload MIMO. The communication system according to the embodiment enables the packet error rate to be further restrained by using the transmission diversity together with the SIC in the overload MIMO. In other words, according to the embodiment, the base station 1 does not set the upper limit to the number of the terminals capable of simultaneously transmitting the radio signals when in the system of performing the communications without allocating the wireless resources to at least one of the plural UEs 2. Even in such a case as not to set the upper limit, the base station 1 demultiplexes the signals coming from the plural UEs 2, thereby attaining the efficient and reliable wireless communications.

Accordingly, in the IoT, the CG is implemented, and the multiple UEs 2 perform the communications with the base station 1 in the excess of the number of the reception antennas of the base station 1, in which case the base station 1 implements the SIC, thereby attaining the efficient and reliable wireless communications with the packet error rate being restrained. The base station 1 uses the transmission diversity together with the SIC, thereby further efficient and reliable wireless communications. In other words, according to the embodiment, when allocating the CG resources to the UEs 2 and granting the CG, the base station 1 executes the SIC processes, whereby it is expected to improve the reliability on the CG-based communications and to enhance the efficiency in the communications by restraining the packet error rate.

According to the embodiment, the base station 1 generates the interference replicas at high accuracy and is enabled to make feedbacks even in the low status of the signal-to-interference-noise-ratio SINR due to the overload MIMO status on the basis of the data after being error-corrected.

What is claimed is:

1. A base station configured to grant communications of a plurality of wireless communication terminals with the base station but not to set an upper limit to a number of wireless communication terminals to be simultaneously connected, the communications being granted without allocating wireless resources based on requests for allocating the wireless resources upon occurrence of requests for the communications with the base station from the plurality of wireless communication terminals, the base station comprising:
 a memory configured to store a plurality of processes; and
 a control unit coupled to the memory and configured to execute the plurality of processes, the plurality of processes comprising:
 a process of receiving modulated radio signals incoming from the plurality of wireless communication terminals;
 a first process of obtaining, from the received modulated radio signals, first signals with at least ones of amplitudes and phases being adjusted, the first signals being incoming from a first wireless communication terminal of or among the plurality of wireless communication terminals, and obtaining first data being demodulated from the first signals;
 a second process of generating, based on the first signals or the first data, replicas of the modulated radio signals incoming from the first wireless communication terminal before at least ones of the amplitudes and the phases are adjusted;
 a third process of extracting signals given by removing the replicas of the incoming radio signals from the received modulated radio signals; and
 a process of iterating the first through third processes successively by using the extracted signals as the received modulated radio signals and using one of second radio communication terminals other than the first radio communication terminal among the plurality of radio communication terminals as the first wireless communication terminal.

2. The base station according to claim 1, wherein the first process includes a diversity process of obtaining the modulated radio signals incoming from the first wireless communication terminal through at least ones of plural different incoming routes and plural different incoming periods of time.

3. The base station according to claim 1, wherein the control unit executes a process of iterating the first through third processes when granting at least one of the plural wireless communication terminals to communicate with the base station in a system of performing the communications by not allocating the wireless resources to at least one of the plural wireless communication terminals.

4. The base station according to claim 1, wherein when communicating in such a system of performing the communications that the base station does not allocate the wireless resources to at least one of the plurality of wireless communication terminals, the base station does not establish an upper limit to the number of terminals to be set on the occasion of setting the number of the wireless communication terminals enabled to transmit the radio signals simultaneously.

5. The base station according to claim 1, wherein the control unit executes, with respect to the first data, an encoding process, a modulating process, a transmission diversity process and a process of reflecting statuses of transmission paths between the plurality of wireless communication terminals and the base station, thereby generating the replicas of the incoming radio signals.

6. A communication method of granting communications of a plurality of wireless communication terminals with a base station but not setting an upper limit to a number of wireless communication terminals to be simultaneously connected, the communications being granted without allocating wireless resources based on requests for allocating the wireless resources upon occurrence of requests for the communications with the base station from the plurality of wireless communication terminals, the method comprising:
 a process of receiving modulated radio signals incoming from the plurality of wireless communication terminals;
 a first process of obtaining, from the received modulated radio signals, first signals with at least ones of amplitudes and phases being adjusted, the first signals being incoming from a first wireless communication terminal of or among the plurality of wireless communication terminals, and obtaining first data being demodulated from the first signals;
 a second process of generating, based on the first signals or the first data, replicas of the modulated radio signals incoming from the first wireless communication terminal before at least ones of the amplitudes and the phases are adjusted;
 a third process of extracting signals given by removing the replicas of the incoming radio signals from the received modulated radio signals; and
 a process of iterating the first through third processes successively by using the extracted signals as the received modulated radio signals and using one of second radio communication terminals other than the first radio communication terminal among the plurality of radio communication terminals as the first wireless communication terminal.

7. The communication method according to claim 6, wherein the first process includes a diversity process of obtaining the modulated radio signals incoming from the first wireless communication terminal through at least ones of plural different incoming routes and plural different incoming periods of time.

8. The communication method according to claim 6, further comprising a process of iterating the first through third processes when granting at least one of the plurality of wireless communication terminals to communicate with the base station in a system of performing the communications by not allocating the wireless resources to at least one of the plurality of wireless communication terminals.

9. The communication method according to claim 6, wherein when communicating in such a system of performing the communications that the base station does not allocate the wireless resources to at least one of the plurality of wireless communication terminals, the base station does not establish an upper limit to the number of terminals to be set on the occasion of setting the number of the wireless communication terminals enabled to transmit the radio signals simultaneously.

10. The communication method according to claim 6, wherein the replicas of the incoming radio signals are generated by executing, with respect to the first data, an encoding process, a modulating process, a transmission diversity process and a process of reflecting statuses of transmission paths between the plurality of wireless communication terminals and the base station.

\* \* \* \* \*